(12) United States Patent
Yoo et al.

(10) Patent No.: US 8,436,813 B2
(45) Date of Patent: *May 7, 2013

(54) POINTING DEVICE AND METHOD AND POINTER DISPLAY APPARATUS AND METHOD

(75) Inventors: Ho-joon Yoo, Goyang-si (KR); Nam-woo Kim, Hanam-si (KR); Ki-wan Choi, Anyang-si (KR); Sun-gi Hong, Hwasung-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 199 days.

This patent is subject to a terminal disclaimer.

(21) Appl. No.: 13/064,868

(22) Filed: Apr. 21, 2011

(65) Prior Publication Data

US 2011/0199300 A1 Aug. 18, 2011

Related U.S. Application Data

(63) Continuation of application No. 11/580,094, filed on Oct. 13, 2006, now Pat. No. 7,952,560.

(30) Foreign Application Priority Data

Feb. 1, 2006 (KR) .......................... 10-2006-0009751

(51) Int. Cl.
*G09G 5/08* (2006.01)
(52) U.S. Cl.
USPC ........... 345/158; 345/169; 345/179; 348/734; 178/19.05
(58) Field of Classification Search .......... 345/156–158, 345/169, 179; 348/734; 178/19.05
See application file for complete search history.

(56) References Cited

U.S. PATENT DOCUMENTS

| 5,446,465 A | 8/1995 | Diefes et al. |
| 5,627,565 A | 5/1997 | Morishita et al. |

(Continued)

FOREIGN PATENT DOCUMENTS

| FR | 2 814 026 | 3/2002 |
| JP | 10-301753 | 11/1998 |

(Continued)

OTHER PUBLICATIONS

U.S. Appl. No. 11/580,094, filed Oct. 13, 2006, Ho-joon Yoo, et al., Samsung Electronics Co., Ltd.

(Continued)

*Primary Examiner* — Lun-Yi Lao
*Assistant Examiner* — Kelly B Hegarty
(74) *Attorney, Agent, or Firm* — Staas & Halsey LLP

(57) ABSTRACT

A pointing apparatus and method and a pointer display apparatus and method using a virtual region which generate a virtual region corresponding to a detected display region, convert coordinates of a location, and display a pointer at the converted coordinates. The pointing device includes a region detector detecting a display region, which displays a pointer, using at least one received signal; a virtual region generator generating the virtual region corresponding to the display region and having an aspect ratio equal to that of the display region; a coordinate converter converting coordinates of a location, which is pointed at by the pointing device, in the virtual region into ratios of the coordinates of the location to a size of the virtual region; and a coordinate ratio transmitter transmitting the ratios.

18 Claims, 12 Drawing Sheets

U.S. PATENT DOCUMENTS

| | | | |
|---|---|---|---|
| 5,926,168 A * | 7/1999 | Fan | 345/158 |
| 6,727,885 B1 * | 4/2004 | Ishino et al. | 345/156 |
| 7,253,803 B2 * | 8/2007 | Schena et al. | 345/163 |
| 2002/0003528 A1 * | 1/2002 | Rosenberg et al. | 345/157 |
| 2002/0175897 A1 | 11/2002 | Pelosi | |
| 2003/0063341 A1 * | 4/2003 | Thomason et al. | 359/15 |
| 2004/0095317 A1 * | 5/2004 | Zhang et al. | 345/158 |
| 2004/0246229 A1 * | 12/2004 | Yamada | 345/156 |
| 2005/0104849 A1 * | 5/2005 | Hoile | 345/157 |
| 2005/0116931 A1 * | 6/2005 | Olbrich | 345/158 |
| 2005/0166163 A1 * | 7/2005 | Chang et al. | 715/863 |
| 2005/0229200 A1 * | 10/2005 | Kirkland et al. | 725/12 |
| 2006/0152487 A1 * | 7/2006 | Grunnet-Jepsen et al. | 345/158 |
| 2006/0152488 A1 * | 7/2006 | Salsman et al. | 345/158 |
| 2006/0152489 A1 * | 7/2006 | Sweetser et al. | 345/158 |
| 2007/0013657 A1 * | 1/2007 | Banning | 345/157 |
| 2007/0040800 A1 * | 2/2007 | Forlines et al. | 345/158 |
| 2007/0049374 A1 | 3/2007 | Ikeda et al. | |
| 2007/0060383 A1 * | 3/2007 | Dohta | 463/43 |
| 2007/0070034 A1 * | 3/2007 | Fanning et al. | 345/156 |
| 2008/0012824 A1 * | 1/2008 | Grunnet-Jepsen et al. | 345/156 |
| 2008/0204404 A1 * | 8/2008 | Kneissler et al. | 345/156 |
| 2009/0207135 A1 * | 8/2009 | Wilson et al. | 345/158 |
| 2010/0309123 A1 * | 12/2010 | Sawai et al. | 345/157 |

FOREIGN PATENT DOCUMENTS

| | | |
|---|---|---|
| JP | 2004-078323 | 3/2004 |
| KR | 10-1999-0061762 | 7/1999 |
| KR | 10-2005-0083723 | 8/2005 |
| WO | 2004/031934 | 4/2004 |

OTHER PUBLICATIONS

U.S. Office Action dated Sep. 17, 2009, issued in the file history of U.S. Appl. No. 11/580,094.

U.S. Office Action dated Apr. 2, 2010, issued in the file history of U.S. Appl. No. 11/580,094.

U.S. Office Action dated Aug. 5, 2010, issued in the file history of U.S. Appl. No. 11/580,094.

U.S. Notice of Allowance dated Jan. 21, 2011, issued in the file history of U.S. Appl. No. 11/580,094.

* cited by examiner

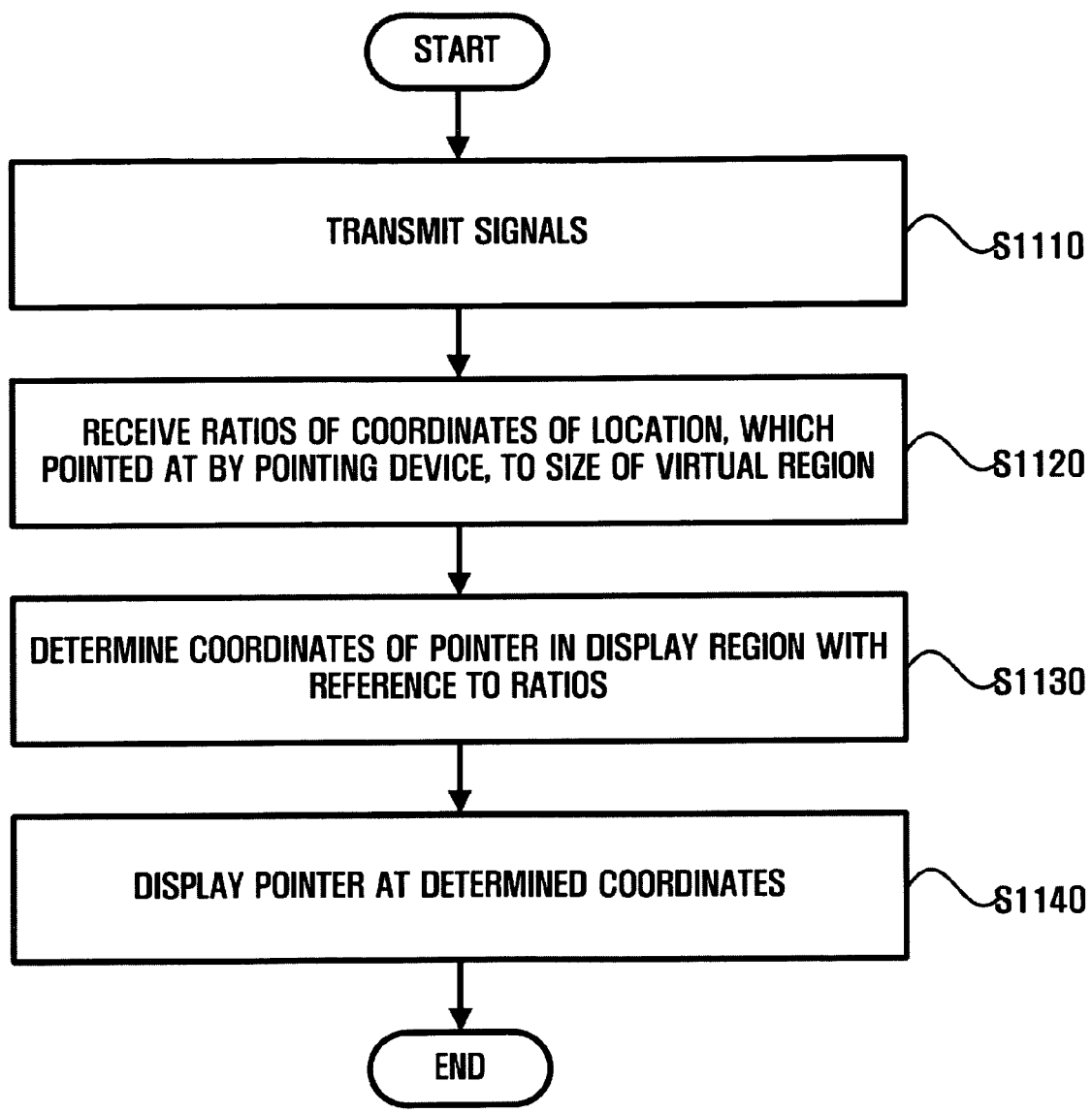

POINTING DEVICE AND METHOD AND POINTER DISPLAY APPARATUS AND METHOD

CROSS-REFERENCE TO RELATED APPLICATIONS

This application is a continuation and claims priority to U.S. application Ser. No. 11/580,094, filed Oct. 13, 2006 now U.S. Pat. No. 7,952,560, which in turn claims priority from Korean Patent Application No. 10-2006-0009751 filed on Feb. 1, 2006 in the Korean Intellectual Property Office, the disclosure of which is incorporated herein by reference in its entirety.

BACKGROUND

1. Field

The present invention relates to a pointer display apparatus and method using a virtual region and, more particularly, to a pointing apparatus and method and a pointer display apparatus and method using a virtual region which generate a virtual region corresponding to a detected display region, convert coordinates of a location, which is pointed at by the pointing device, in the virtual region into coordinates of the location in the display region, and display a pointer at the converted coordinates.

2. Description of the Related Art

Direct pointing devices are input devices which can extract the display region of a display device such as a digital television (TV), detect the location of a portion on the screen currently being pointed at by a pointer, and control the location of the pointer displayed on the screen of the display device according to the results of the detection.

Direct pointing devices use a direct mapping method by which a pointer is displayed at a place pointed at by a user and thus can manipulate the location of a pointer more quickly and easily than pointing devices such as mice or keypads which use a relative mapping method. Also, direct pointing devices can allow a user to control the location of a pointer from a distance.

However, if a pointer is displayed in a display region of a display device using a direct pointing device, a user may have difficulty determining the location of the pointer as the distance between the display device and the direct pointing device increases.

FIG. 1 is a view for illustrating a method of displaying a pointer using a conventional direct pointing device 20*a* or 20*b*. Specifically, FIG. 1 illustrates an effective angle 25*a* or 25*b* of the direct pointing device 20*a* or 20*b*, respectively, which allows the pointer to be displayed in a display region 15 of a display device 10 according to the distance between the display device 10 and the direct pointing device 20*a* or 20*b*.

In other words, when the direct pointing device 20*a* is located a short distance away from the display device 10, directions in which the direct pointing device 20*a* points (hereinafter referred to as pointing directions) are within a relatively wide angle range. Conversely, when the direct pointing device 20*b* is located further from the display device 10, the pointing directions of the direct pointing device 20*b* are within a narrower angle range.

Therefore, when displaying the pointer in the display region 15 using the direct pointing device 20*a* at a short distance from the display device 10, a user can determine the location of the pointer in the display region 15 without much difficulty. However, when displaying the pointer in the display region 15 using the direct pointing device 20*b* at a long distance from the display device 10, the user may have difficulty determining the location of the pointer. In other words, since a slight change in the pointing direction results in a great change in the location of the pointer, the user cannot precisely change the location of the pointer and may have more severe hand shaking.

Korean Patent Publication No. 2005-083723 discloses a cursor for electronic devices. In this publication, a correlation between the cursor location in a display region and the location of a displayed part of a virtual region within the whole virtual region is determined so that the cursor location in the display region reflects the location of the displayed part of the virtual region in proportion to the whole virtual region.

The above invention is used to search a particular virtual region within the whole virtual region that exceeds the range of the display region, but does not disclose a method of determining the location of a pointer according to the position of a user.

Therefore, it is required to develop a method by which a user can easily determine the location of a pointer regardless of the distance between a display device and a pointing device.

SUMMARY

It is an aspect of the present invention to convert coordinates of a location, which is pointed at by a pointing device, in a virtual region into coordinates of the location in a display region and display a pointer at the converted coordinates.

However, the aspects of the present invention are not restricted to the one set forth herein. The above and other objectives of the present invention will become more apparent to one of daily skill in the art to which the present invention pertains by referencing a detailed description of the present invention given below.

According to an aspect of the present invention, there is provided a pointing device using a virtual region. The device includes a region detector detecting a display region, which displays a pointer, using at least one received signal; a virtual region generator generating the virtual region corresponding to the display region and having an aspect ratio equal to that of the display region; a coordinate converter converting coordinates of a location, which is pointed at by the pointing device, in the virtual region into ratios of the coordinates of the location to a size of the virtual region; and a coordinate ratio transmitter transmitting the ratios.

According to another aspect of the present invention, there is provided a pointer display apparatus using a virtual region. The apparatus includes a region signal transmitter transmitting at least one signal using at least one signal transmission unit; a coordinate ratio receiver receiving from a pointing device ratios of coordinates of a location, which is pointed at by the pointing device, in the virtual region to a size of the virtual region in response to the signals transmitted from the region signal transmitter; a coordinate determiner determining coordinates of a pointer in a display region with reference to the ratios; and a display displaying the pointer at the determined coordinates in the display region.

According to another aspect of the present invention, there is provided a pointing method using a virtual region. The method includes detecting a display region, which displays a pointer, using at least one received signal; generating the virtual region corresponding to the display region and having an aspect ratio equal to that of the display region; converting coordinates of a location, which is pointed at by a pointing device, in the virtual region into ratios of the coordinates of the location to a size of the virtual region; and transmitting the ratios.

According to another aspect of the present invention, there is provided a pointer display method using a virtual region. The method includes transmitting at least one signal using at least one signal transmission unit; receiving from a pointing device ratios of coordinates of a location, which is pointed at by the pointing device, in the virtual region to a size of the virtual region in response to the signals; determining coordinates of a pointer in a display region with reference to the ratios; and displaying the pointer at the determined coordinates in the display region.

BRIEF DESCRIPTION OF THE DRAWINGS

The above and other features and advantages of the present invention will become more apparent by describing in detail preferred embodiments thereof with reference to the attached drawings in which:

FIG. 11 is a flowchart illustrating the operation of the pointer display apparatus of FIG. 4.

DETAILED DESCRIPTION OF THE EMBODIMENTS

Figure 1:
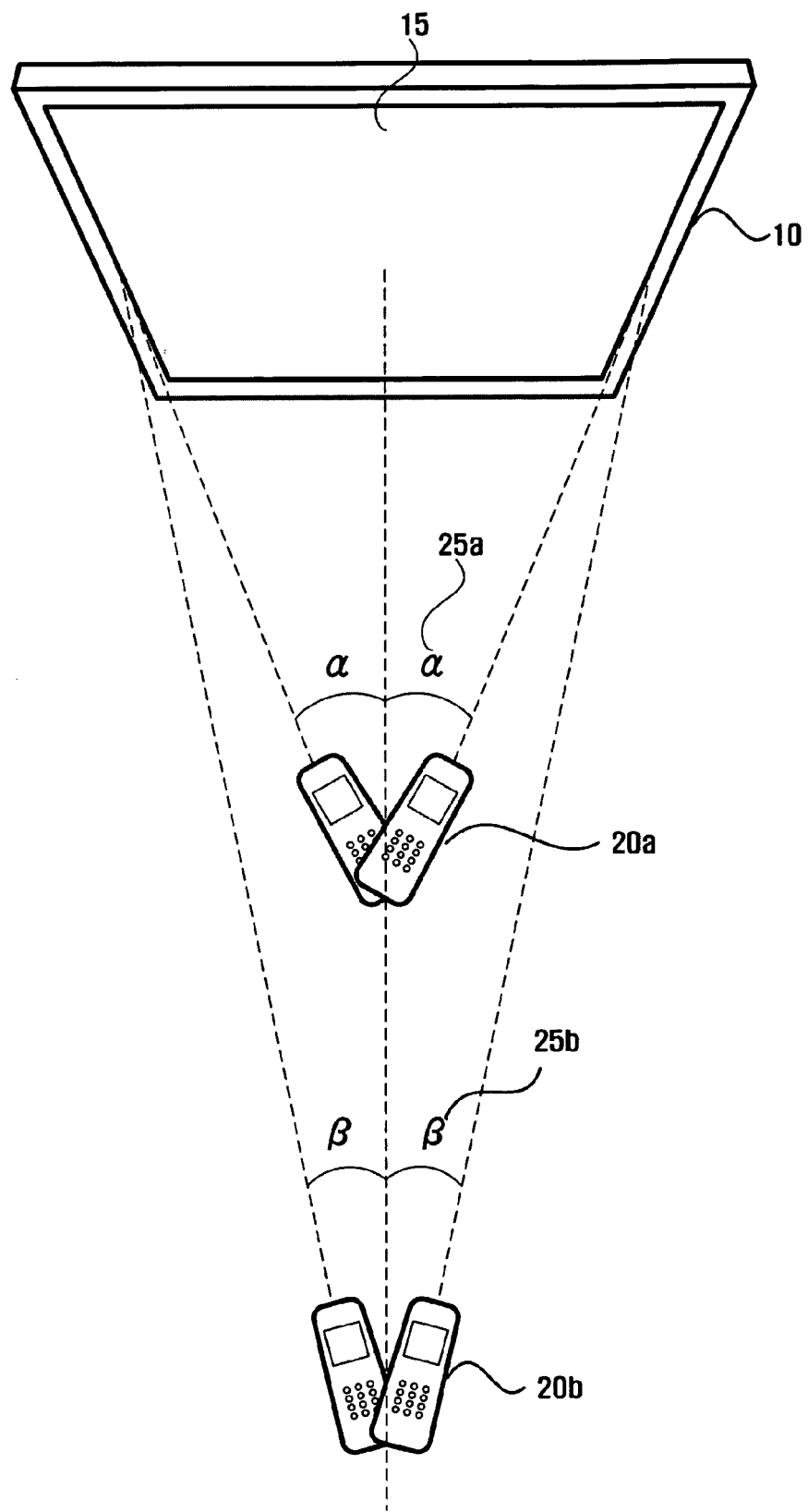
FIG. 1 is a view for illustrating a method of displaying a pointer using a conventional direct pointing device.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Hereinafter, embodiments of the present invention will be described in detail with reference to the attached drawings.

Figure 2:
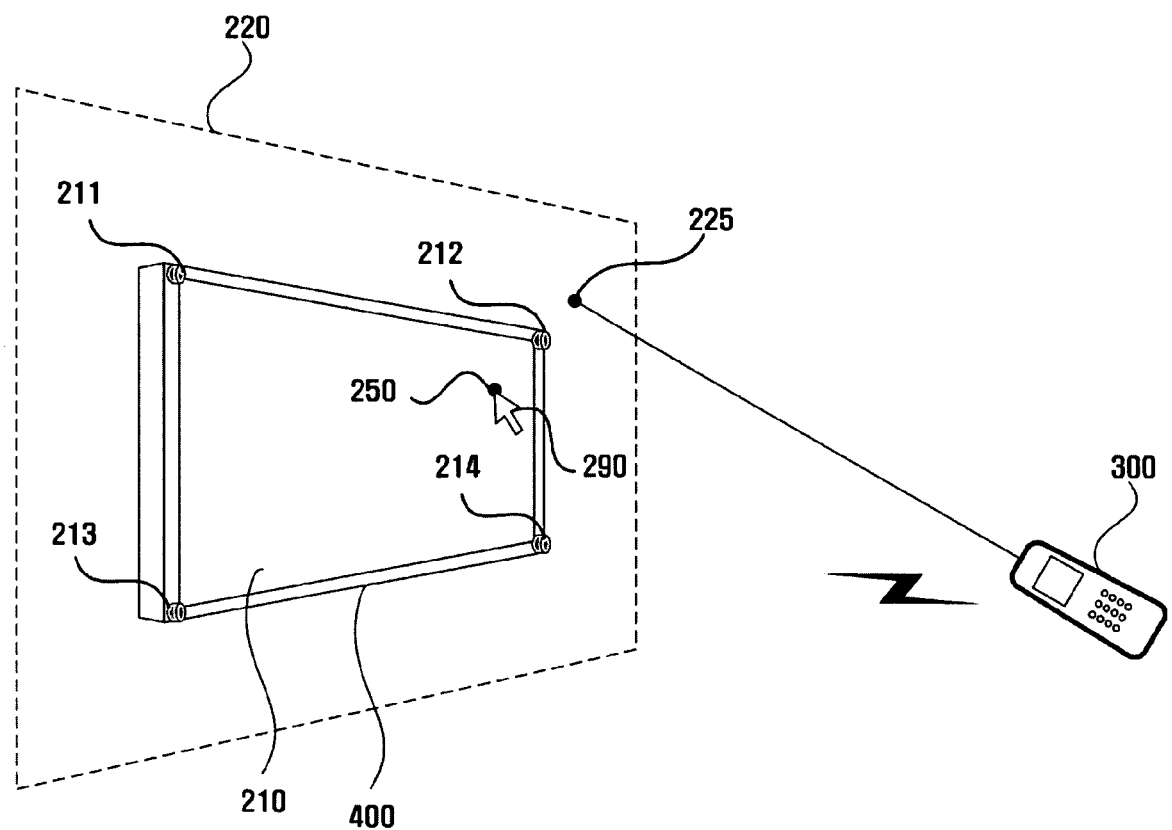
FIG. 2 is a system diagram illustrating a method of displaying a pointer using a virtual region according to an embodiment of the present invention.

FIG. 2 is a system diagram illustrating a method of displaying a pointer using a virtual region according to an embodiment of the present invention. Referring to FIG. 2, the pointer display system includes a pointing device 300 and a pointer display apparatus 400.

The pointer display apparatus 400 includes at least one of signal transmission units 211 through 214. The signal transmission units 211 through 214 transmit a signal such as an infrared signal or an ultrasonic signal. The pointing device 300 receives the signal from the signal transmission units 211 through 214 and detects a display region 210 of the pointer display apparatus 400. To this end, the signal transmission units 211 through 214 may be installed at front edges of the pointer display apparatus 400.

The pointing device 300, which detects the display region 210 of the pointer display apparatus 400, generates a virtual region 220 with an aspect ratio according to that of the display region 210. The size of the virtual region 220 may vary according to the distance between the pointer display apparatus 400 and the pointing device 300. Therefore, the greater the distance between the pointer display apparatus 400 and the pointing device 300, the larger the size of the virtual region 220 may become. Conversely, the closer the distance between the pointer display apparatus 400 and the pointing device 300, the smaller the size of the virtual region 220 may become.

In addition, when the distance between the pointer display apparatus 400 and the pointing device 300 is greater than a predetermined threshold value, the virtual region 220 may be formed larger than the display region 210. Conversely, when the distance between the pointer display apparatus 400 and the pointing device 300 is less than the predetermined threshold value, the virtual region 220 may be formed smaller than the display region 210.

A user points at a location 225 in the virtual region 220 using the pointing device 300. Coordinates of the location 225 thus pointed at by the user, that is, coordinates in the virtual region 220, are transmitted to the pointer display apparatus 400. In this case, the coordinates in the virtual region are relative coordinates, not absolute coordinates. For example, if the coordinates of the location 225, which is pointed at by the user, in the virtual region 220 with an aspect ratio of 400×300 are (300, 200), the pointing device 300 does not transmit the coordinates (300, 200) to the pointer display apparatus 400. Instead, the pointing device 300 transmits a ratio of the location 225 to the size of the virtual region 220 to the pointer display apparatus 400. In other words, the pointing device 300 transmits $$\left(\frac{300}{400}, \frac{200}{300}\right)$$

to the pointer display apparatus 400.

The pointer display apparatus 400 multiplies the aspect ratio of the display region 210 with the received ratio and consequently extracts coordinates 250 of a pointer 290 actually displayed. For example, if the received ratio is $$\left(\frac{300}{400}, \frac{200}{300}\right)$$

and the size of the display region 210 is 200×150, the coordinates 250 of the displayed pointer 290 is $$\left(200\times\frac{300}{400}, 150\times\frac{200}{300}\right).$$

Figure 3:
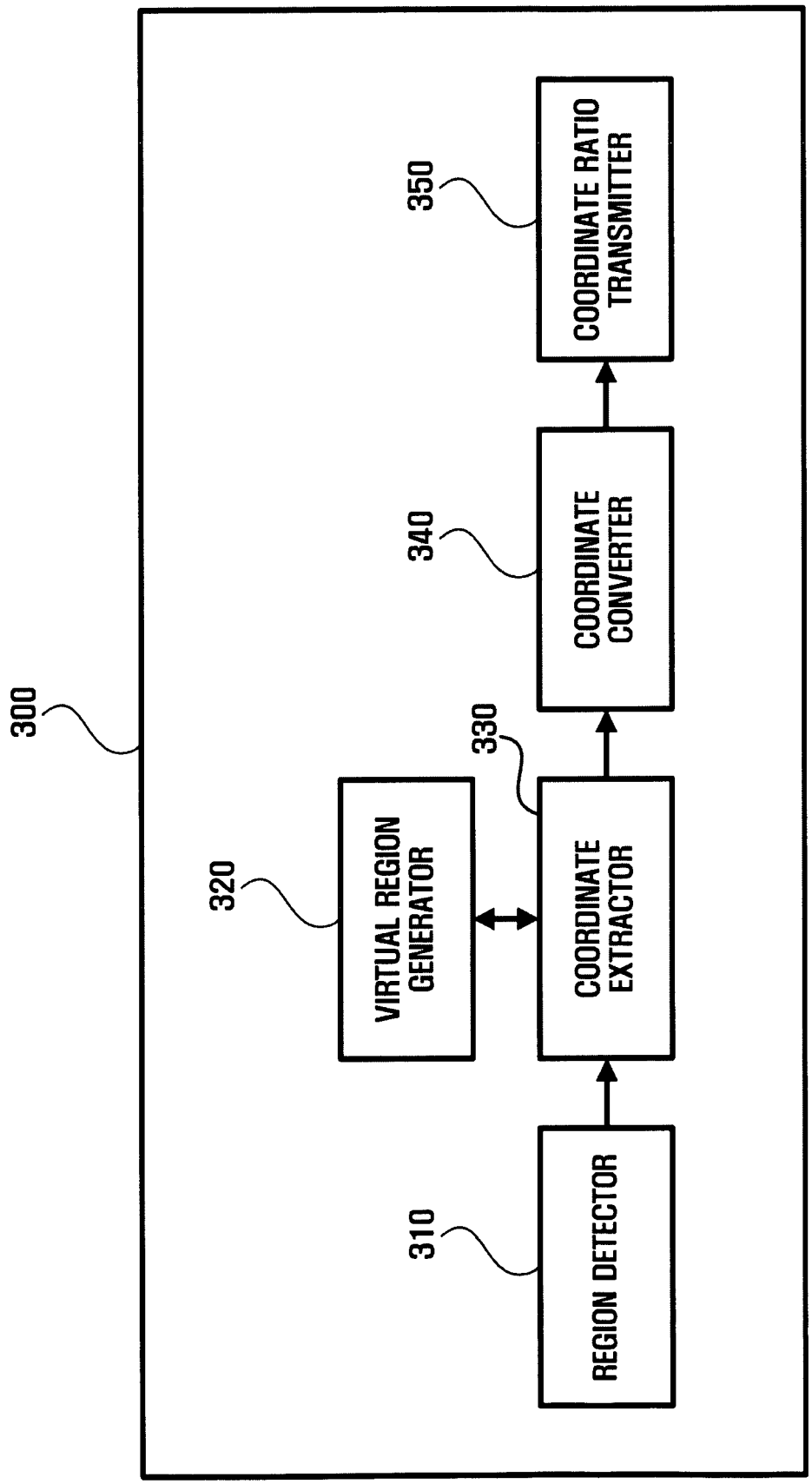
FIG. 3 is a block diagram of a pointing device illustrated in FIG. 2.

FIG. 3 is a block diagram of the pointing device 300 illustrated in FIG. 2. Referring to FIG. 3, the pointing device 300 includes a region detector 310, a virtual region generator 320, a coordinate extractor 330, a coordinate converter 340, and a coordinate ratio transmitter 350.

The region detector 310 detects the display region 210 in which the pointer 290 is displayed using at least one received signal. For example, when receiving one signal, the region detector 310 forms a region centering on a point at which the signal is generated and detects the region as the display region 210. When receiving a plurality of signals, the region detector 310 detects a region formed by connecting points at which the signals are generated as the display region 210.

The signals may include at least one of an infrared signal and an ultrasonic signal. When the region detector 31 receives a plurality of signals, the signals may be unique signals. For example, when the signal transmission units 211 through 214 are installed respectively at four edges of the pointer display apparatus 400 and each of the signal transmission units 211 through 214 transmits a unique signal, the region detector 310 which receives the unique signals respectively from the signal transmission units 211 through 214 may detect the display region 210 using all or some of the received signals.

In addition, the region detector 310 may analyze the received signals and detect the distance and direction from the pointer display apparatus 400 to the pointing device 300.

The virtual region generator 320 generates the virtual region 220 with an aspect ratio equal to that of the display region 210. For example, when the aspect ratio of the display region 210 is 4:3, the virtual region generator 320 generates the virtual region 220 with the aspect ratio of 4:3, and when the aspect ratio of the display region 210 is 16:9, the region generator 320 generates the virtual region 220 with the aspect ratio of 16:9. Here, the virtual region generator 320 generates the virtual region such that the center of the virtual region 220 coincides with that of the display region 210.

The virtual region generator 320 may generate the virtual region 220 with reference to the distance and direction from the pointer display apparatus 400 to the pointing device 300. In other words, when at a short distance from the pointer display apparatus 400, the virtual region generator 320 generates the virtual region 220 to be a small-sized virtual region. When at a long distance from the pointer display apparatus 400, the virtual region generator 320 generates the virtual region 220 to be a large-sized virtual region.

If the pointing device 300 is not perpendicular to the plane of the display region of the pointer display apparatus, the display region 210 may be distorted. Therefore, the virtual region generator 320 may generate the virtual region 220 to be a distorted virtual region corresponding to the distorted display region 210 with reference to the direction from the pointer display apparatus 400 to the pointing device 300, which is received from the region detector 310.

As described above, the size of the virtual region 220 varies according to the distance between the pointer display apparatus 400 and the pointing device 300. When the distance between the pointer display apparatus 400 and the pointing device 300 is less than a predetermined threshold value, the virtual region 220 may be formed smaller than the display region 210. When the distance between the pointer display apparatus 400 and the pointing device 300 is greater than the predetermined threshold value, the virtual region 220 may be formed larger than the display region 210. Accordingly, a user can control the position 250 (the position, i.e., the coordinates 250) of the pointer 290 within the display region 210 to be in the same radius of action as the pointing device 300 regardless of the distance between the pointer display apparatus 400 and the pointing device 300.

For example, when the user desires to move the pointer 290 to a left or right side of the display region 210, if the pointing direction of the pointing device 300 toward the display region 210 is 30 degrees to the left or to right when the pointing device 300 is at a point located at a predetermined threshold distance, the pointing direction of the pointing device 300 is still 30 degrees to the left or right when the pointing device 300 is either at a point located at a distance that exceeds a predetermined threshold value or at a point located at a distance that does not exceed the predetermined threshold value. For example, when the user desires to move the pointer 290 to a left or right side of the display region 210, the pointing direction of the pointing device 300 toward the display region 210 is, e.g., 30 degrees to the left or right when the pointing device 300 is at a point located at a predetermined threshold distance. When the pointing device 300 is moved closer to or further from the pointer display apparatus 400, the pointing direction of the pointing device 300 is still 30 degrees to the left or right with the pointer remaining within the same radius of action.

The coordinate extractor 330 extracts the coordinates of the location 225, which is pointed at by the pointing device 300, in the virtual region 220. The coordinates of the location 225 extracted by the coordinate extractor 330 are absolute coordinates in the virtual region 220.

The size of the virtual region 220, which is generated by the virtual region generator 320 and transmitted to the coordinate extractor 330, may remain unchanged regardless of the distance between the pointer display apparatus 400 and the pointing device 300. For example, if the preset size of the virtual region 220 is 1280×1024, the size of the virtual region 220 transmitted to the coordinate extractor 330 is still 1280×1024. In this case, the coordinates of the location 225 pointed at by the pointing device 300 can be extracted from the range of (0, 0) to (1279, 1023).

The coordinate converter 340 converts the coordinates of the location 225 in the virtual region 220 into ratios of the coordinates to the size of the virtual region 220. For example, if the size of the virtual region is 1280×1024 and the coordinates of the location 225 are (200, 300), the ratios of the coordinates to the size of the virtual region are $$\left(\frac{200}{1280}, \frac{300}{1024}\right).$$

The coordinate ratio transmitter 350 transmits the ratios of the coordinates of the location 225 to the size of the virtual region 220 to the pointer display apparatus 400. The coordinate ratio transmitter 350 may communicate with the pointer display apparatus 400 using a wired communication method such as Ethernet, a universal serial bus (USB), Institute of Electrical & Electronics Engineers 1394 Standard (IEEE 1394), serial communication or parallel communication, or a wireless communication method such as infrared communication, Bluetooth, home radio frequency (HomeRF) or a wireless local area network (WLAN).

Figure 4:
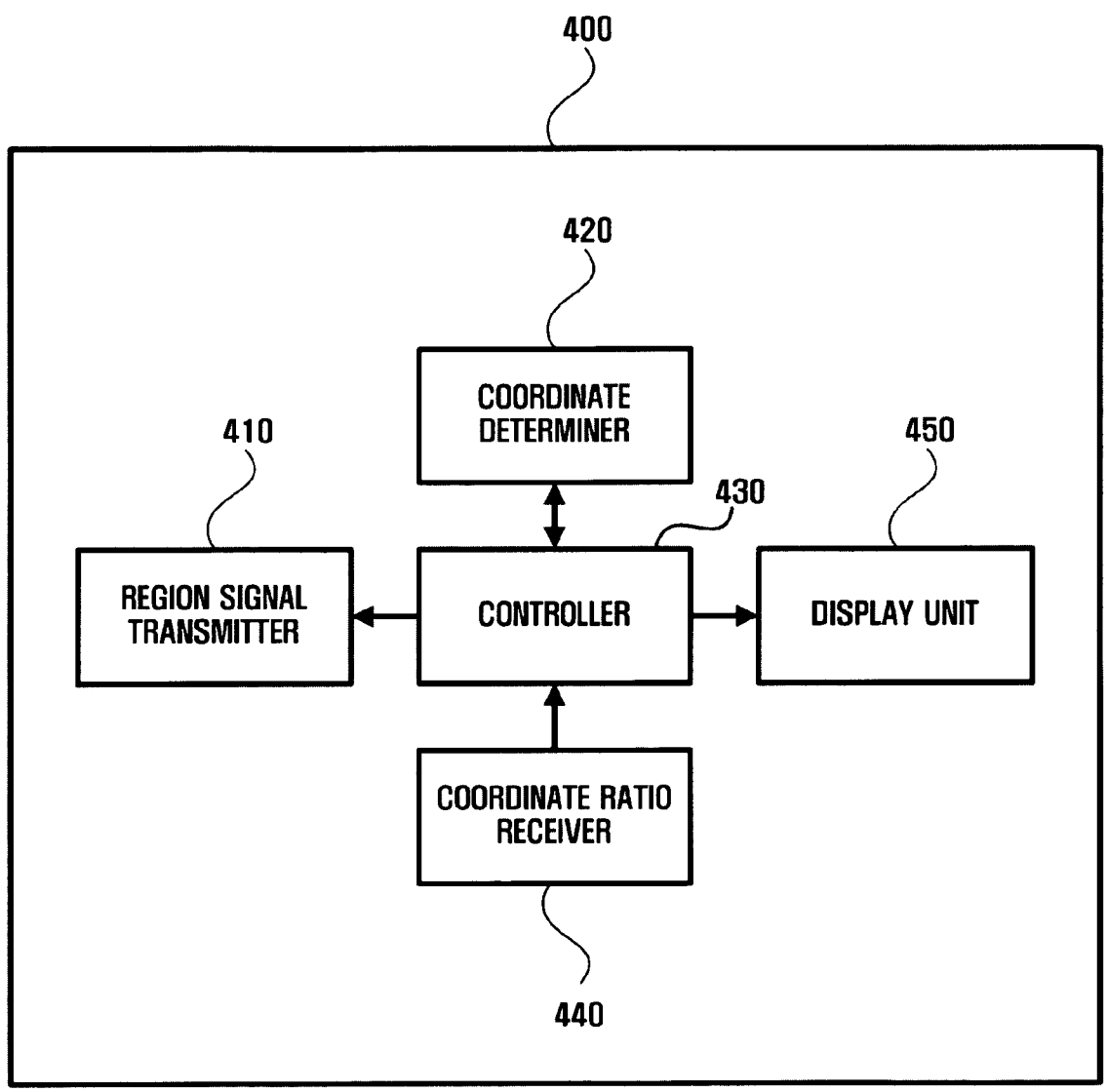
FIG. 4 is a block diagram of a pointer display apparatus illustrated in FIG. 2.

FIG. 4 is a block diagram of the pointer display apparatus 400 illustrated in FIG. 2. Referring to FIG. 4, the pointer display apparatus 400 includes a region signal transmitter 410, a coordinate determiner 420, a controller 430, a coordinate ratio receiver 440, and a display unit 450.

The region signal transmitter 410 transmits signals using at least one signal transmission unit. The signals may include at least one of an infrared signal and an ultrasonic signal. In addition, the region signal transmitter 410 may transmit a signal unique to each signal transmission unit.

The signal transmission unit may be installed on a front surface of the pointer display apparatus 400. In particular, the signal transmission unit may be installed at each edge of the display region 210 on the front surface of the pointer display apparatus 400 such that the pointing device 300 can detect the shape of the display region 210.

The coordinate ratio receiver 440 receives from the pointing device 300 the ratios of the coordinates of the location 225, which is pointed at by the pointing device 300, in the virtual region 220 to the size of the virtual region 220 in response to the signal transmitted from the region signal transmitter 410. The coordinate ratio receiver 440 may communicate with the pointing device 300 using a wired communication method such as Ethernet, a USB, IEEE 1394, serial communication or parallel communication, or a wireless communication method such as infrared communication, Bluetooth, HomeRF or a WLAN.

The coordinate determiner 420 determines the coordinates 250 of the pointer 290 in the display region 210 with reference to the ratios of the coordinates of the location 225 in the virtual region 220 to the size of the virtual region 220. As described above with reference to FIG. 3, the ratios refer to the ratios of the coordinates 250 of the pointer 290 within the virtual region 220 to the size of the virtual region 220 and include horizontal and vertical ratios. Accordingly, the coordinate determiner 420 determines the coordinates 250 of the pointer 290 by applying the horizontal and vertical ratios included in the ratios of the coordinates 250 of the pointer 290 within the virtual region 220 to the size of the virtual region 220 respectively to the horizontal and vertical sizes of the display region 210. In other words, the horizontal ratio is multiplied by the horizontal size of the display region 210, and the vertical ratio is multiplied by the vertical size of the display region 210 to determine the ratios of the coordinates 250 of the pointer 290 within the virtual region 220 to the size of the virtual region 220.

The display unit 450 is a module including an image display unit such as a cathode ray tube (CRT) which can display an input image signal, a liquid crystal display (LCD), a light-emitting diode (LED), an organic light-emitting diode (OLED), or a plasma display panel (PDP). The display unit 450 displays the pointer 290 at the coordinates of the pointer 290 determined by the coordinate determiner 420.

The controller 430 controls the region signal transmitter 410, the coordinate determiner 420, the coordinate ratio receiver 440, the display unit 450, and the pointer display apparatus 400.

Figure 5A:
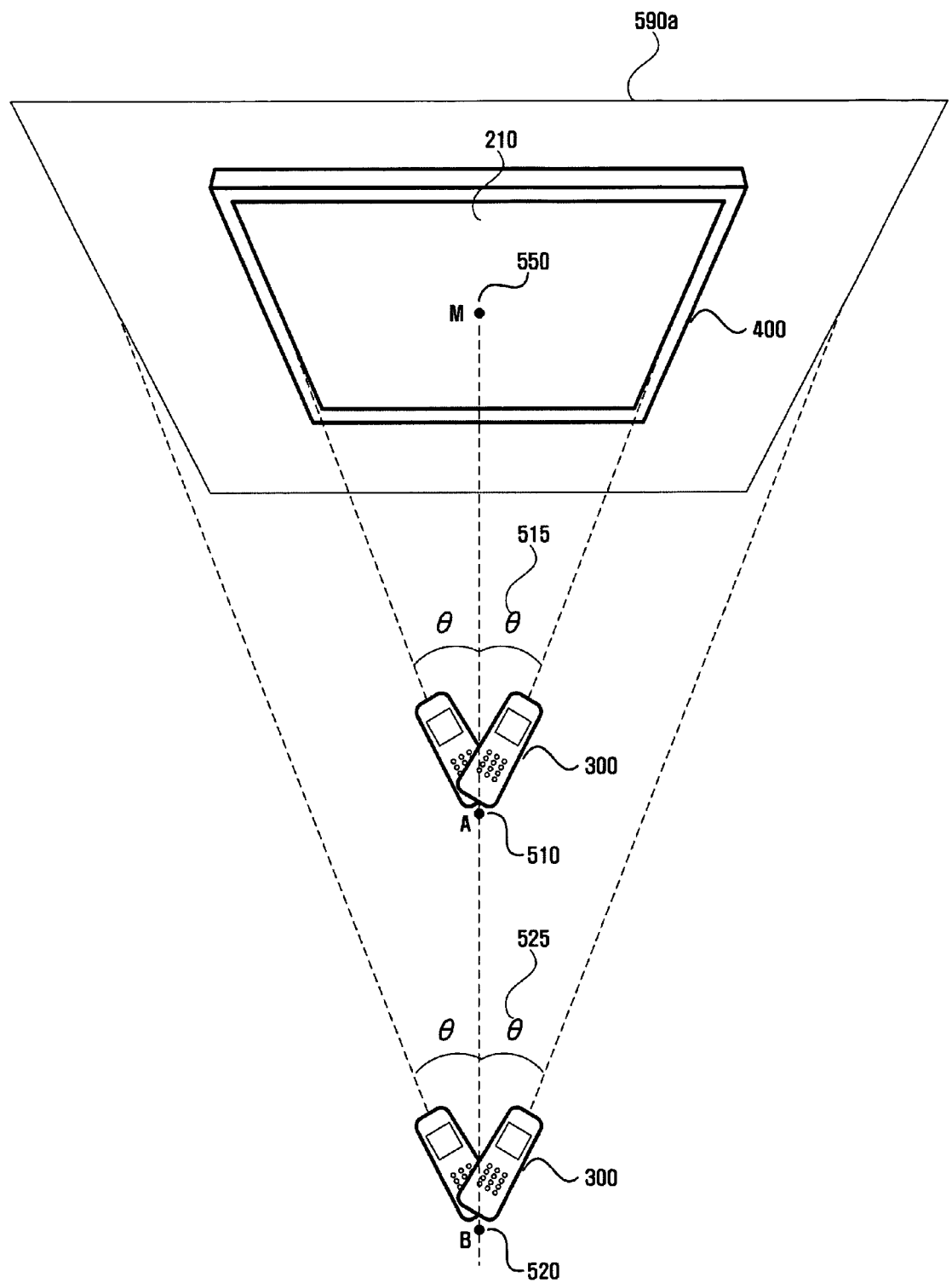
FIGS. 5A and 5B are views for illustrating the relationship between a display region and a virtual region according to an embodiment of the present invention.
Figure 5B:
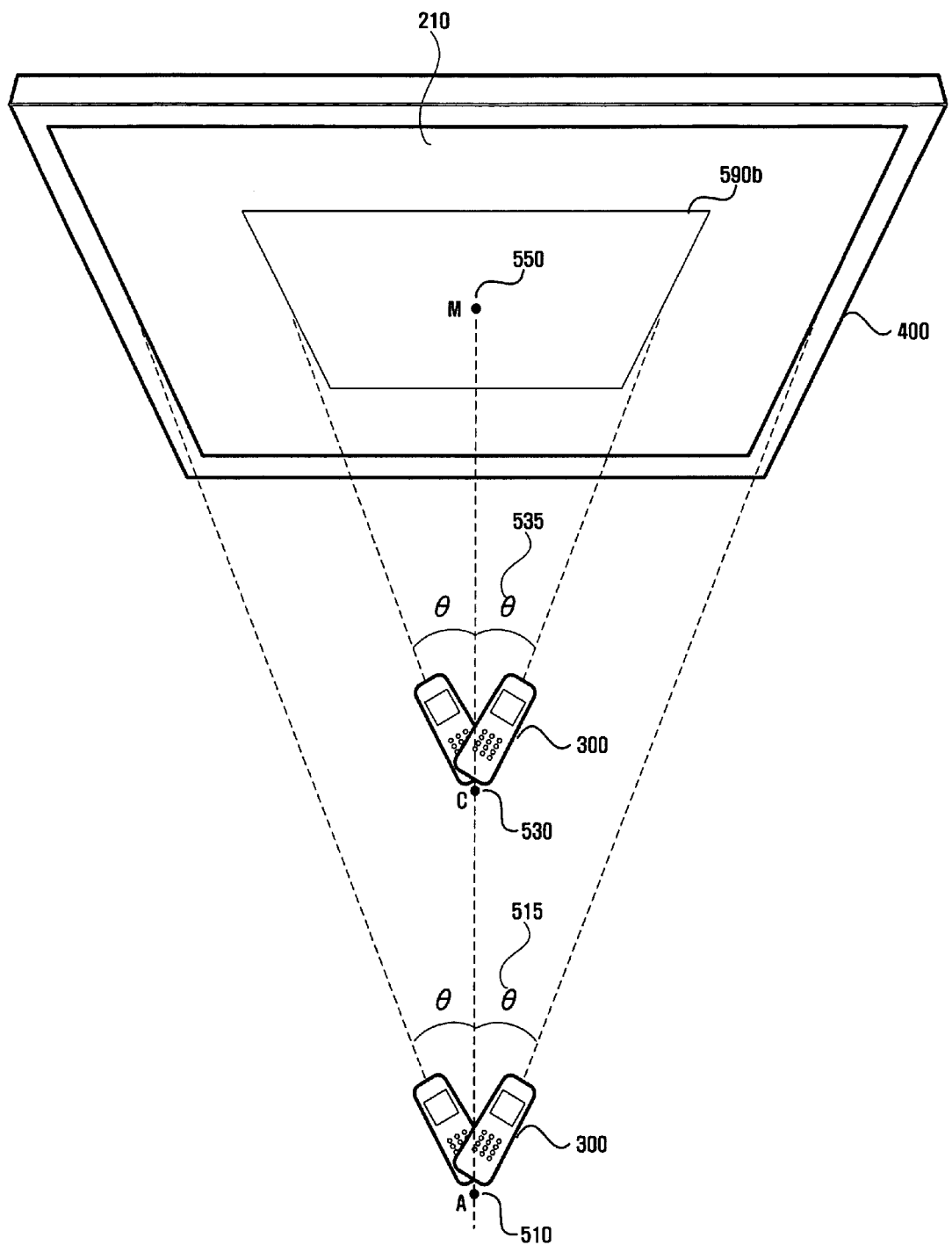

FIGS. 5A and 5B are views for illustrating the relationship between the display region 210 and a virtual region 590a or 590b, respectively, according to an embodiment of the present invention. Specifically, FIG. 5A illustrates a case where the distance between the pointing device 300 and the pointer display apparatus 400 is greater than a predetermined threshold value, and FIG. 5B illustrates a case where the distance between the pointing device 300 and the pointer display apparatus 400 is less than the predetermined threshold value.

Referring to FIG. 5A, point A (510) is located at a threshold distance between the pointing device 300 and the pointer display apparatus 400. At point A (510), an operating angle range 515 within which the pointing device 300 can point to a left or right end of the display region 210 is θ to the left or right, respectively.

When the pointing device 300 is at point B (520), the virtual region 590a is formed larger than the display region 210. The size of the virtual region 590a is formed to be equal to that of a virtual region which can be formed when an operating angle range 525 within which the pointing device 300 located at point B (520) can point to a left or right end of the virtual region 590a is θ to the left or right, respectively.

In other words, a user can determine the position of a pointer within the operating angle range 515 regardless of whether the pointing device 300 is at point A (510) or point B (520).

Similarly, referring to FIG. 5B, point A (510) is located at a threshold distance between the pointing device 300 and the pointer display apparatus 400. At point A (510), an operating angle range 515 within which the pointing device 300 can point to a left or right end of the display region 210 is θ to the left or right, respectively.

When the pointing device 300 is at point C (530), the virtual region 590b is formed smaller than the display region 210. The size of the virtual region 590b is equal to that of a virtual region which can be formed when an operating angle range 535 within which the pointing device 300 located at point C (530) can point to a left or right end of the virtual region 590b is θ to the left or right, respectively.

In other words, a user can easily determine the position of a pointer within the operating angle range 515 regardless of whether the pointing device 300 is at point A (510) or point C (530).

In FIGS. 5A and 5B, point M (550) is the center of the display region 210, and the virtual regions 590a and 590b are formed centering on point M (550).

Figure 6A:
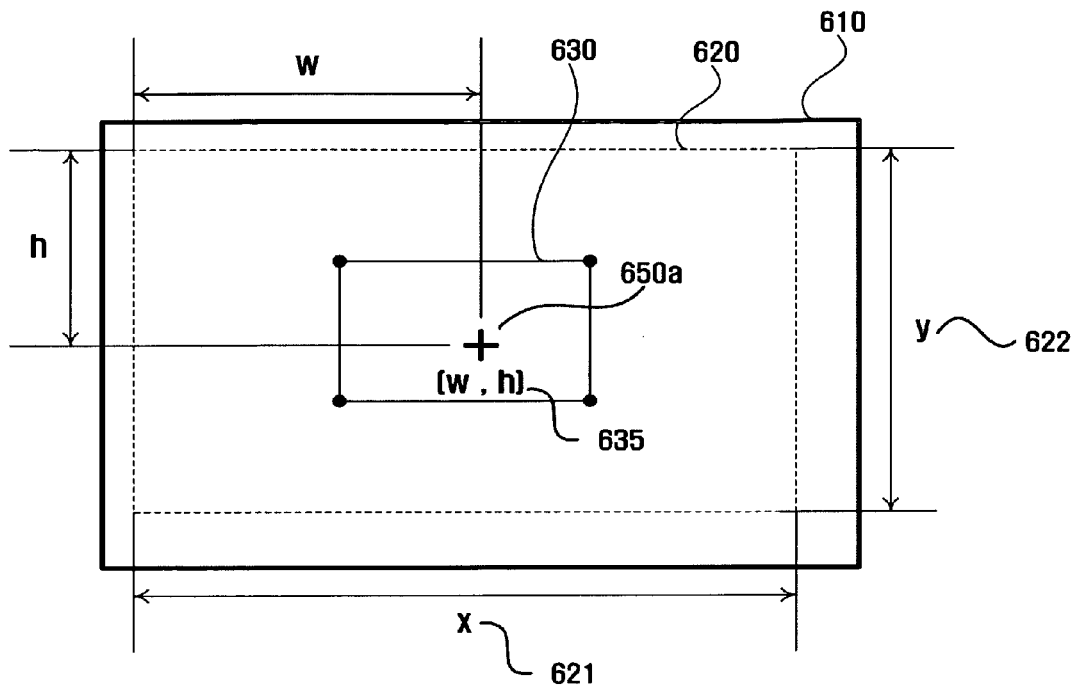
FIGS. 6A and 6B are views for illustrating a method of determining the position of a pointer using the pointing device according to an embodiment of the present invention.
Figure 6B:
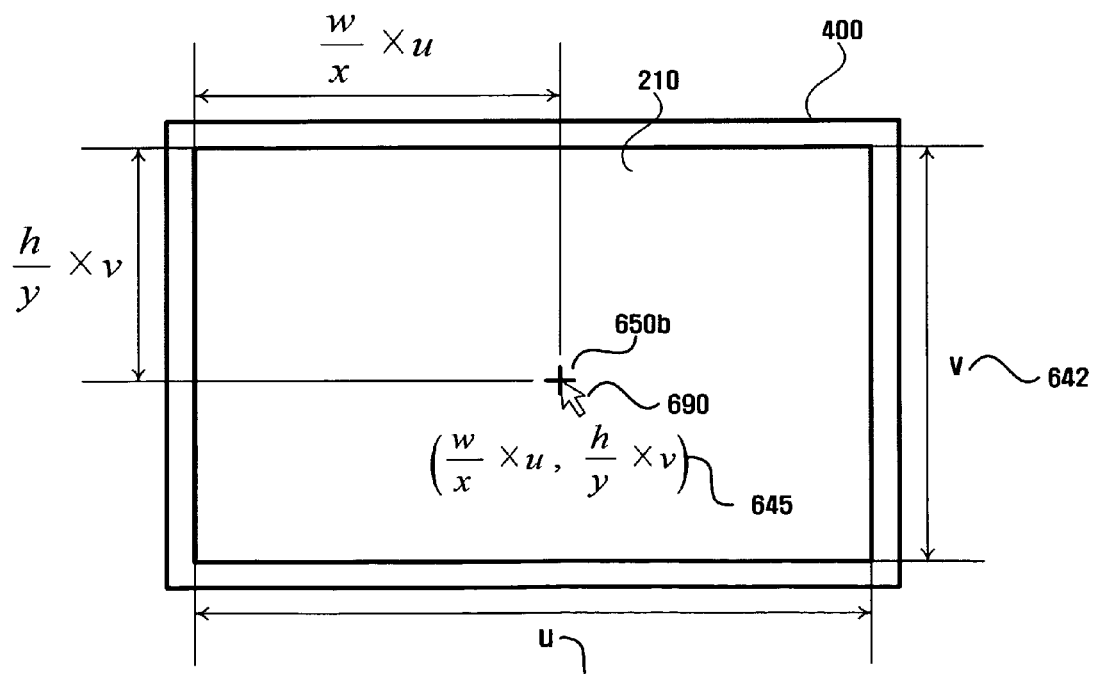

FIGS. 6A and 6B are views for illustrating a method of determining the position of a pointer using the pointing device 300 according to an embodiment of the present invention. In this method, the position of the pointer is determined using regions recognized by the pointing device 300.

The regions recognized by the pointing device 300 include a basic recognition region 610, a display recognition region 630, and a virtual recognition region 620.

The basic recognition region 610 is a region recognized by the pointing device 300 among regions in a direction in which the pointing device 300 points. A center 650a of the basic recognition region 610 is the pointing direction of the pointing device 300.

The display recognition region 630 refers to the display region 210 which is included in the basic recognition region 610 and is recognized by the pointing device 300.

The virtual recognition region 620 refers to a virtual region which is included in the basic recognition region 610 and is recognized by the pointing device 300. All or part of the virtual recognition region 620 may be included in the basic recognition region 610 according to the position of the display recognition region 630.

Referring to FIG. 6A, both the virtual recognition region 620 and the display recognition region 630 are included in the basic recognition region 610.

The virtual recognition region 620 is formed based on the size and shape of the display recognition region 630. The coordinate extractor 330 extracts coordinates 635 of the pointer within the virtual recognition region 620. In other words, the coordinate extractor 330 extracts the coordinates 635 of a location pointed at by the pointing device 300 with respect to a top left corner of the virtual recognition region 620. In FIG. 6A, the coordinates 635 of the pointer are (w, h).

The coordinate converter 340 converts the coordinates 635 of the pointer into ratios of the coordinates 635 to the size of the virtual recognition region 620. Referring to FIG. 6A, a horizontal size 621 and a vertical size 622 of the virtual recognition region 620 are x and y, respectively. Hence, a horizontal ratio of the coordinates 635 of the pointer to the size of the virtual recognition region 620 is $$\frac{w}{x},$$

and a vertical ratio is $$\frac{h}{y}.$$

The horizontal and vertical ratios are transmitted to the pointer display apparatus 400. Then, the coordinate determiner 420 included in the pointer display apparatus 400 determines coordinates 645 of a pointer 690 to be actually displayed by applying the received horizontal and vertical ratios to a horizontal size 641 and a vertical size 642 of the display region 210, respectively. In other words, since the received horizontal and vertical ratios are $$\frac{w}{x}$$

and $$\frac{h}{y},$$

respectively, and the horizontal and vertical sizes 641 and 642 of the display region 210 are u and v, the determined coordinates 645 of the pointer 690 are $$\left(\frac{w}{x} \times u, \frac{h}{y} \times v\right).$$

Figure 7:
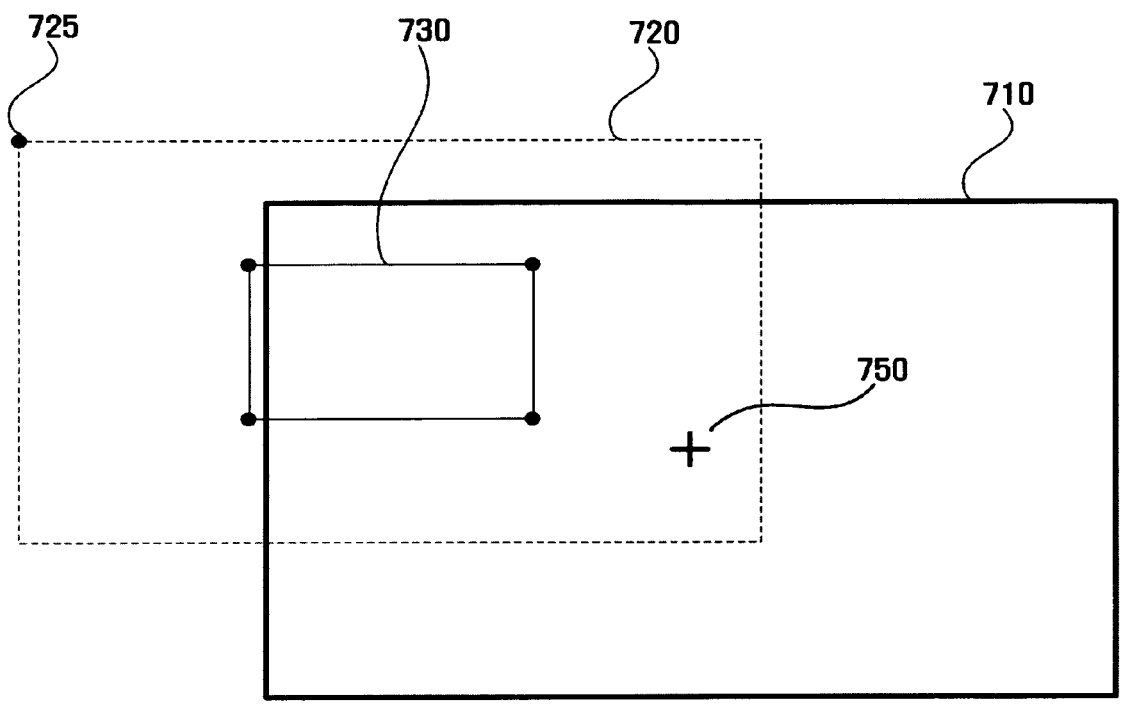
FIG. 7 illustrates a case where a virtual recognition region and a display recognition region are partially included in a basic recognition region according to an embodiment of the present invention.

FIG. 7 illustrates a case where a virtual recognition region 720 and a display recognition region are partially included in a basic recognition region 710 according to an embodiment of the present invention. Referring to FIG. 7, even if a top left corner 725 of the virtual recognition region 720 is not included in the basic recognition region 710, since the virtual recognition region 720 is formed based on the display recognition region 730, the coordinate extractor 330 of the pointing device 300 can still extract coordinates of a location 750 pointed at by the pointing device 300. Accordingly, the coordinate determiner 420 of the pointer display apparatus 400 can determine coordinates of a pointer to be displayed. In addition, when a plurality of unique signals are received, even though not all of the received signals are detected, the shape and size of the display recognition region 730 can be detected.

Figure 8:
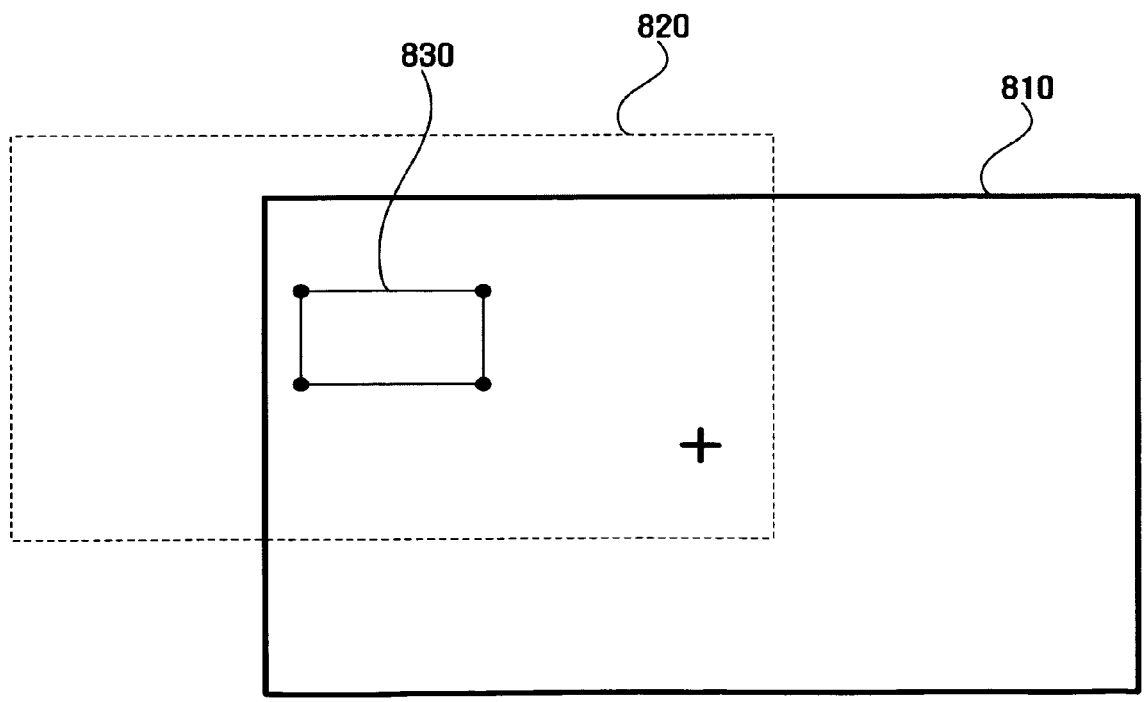
FIG. 8 illustrates a case where part of a virtual recognition region and an entire display recognition region are included in a basic recognition region according to an embodiment of the present invention.

FIG. 8 illustrates a case where part of a virtual recognition region 820 and an entire display recognition region 830 are included in a basic recognition region 810 according to an embodiment of the present invention. In other words, FIG. 8 illustrates a case where the pointer display apparatus 400 are located a large distance from the pointing device 300 or a case where the pointing direction of the pointing device 300 is a predetermined or greater angle away from the display region 210.

Since the pointer display apparatus 400 is located a large distance from the pointing device 300, the pointing device 300 recognizes the display recognition region 830 included in the basic recognition region 810 as being small. However, the size of the virtual recognition region 820 remains unchanged regardless of the distance between the pointer display apparatus 400 and the pointing device 300. In other words, the size of the virtual recognition region 720 when the pointer display apparatus 400 is located a short distance from the pointing device 300, which is illustrated in FIG. 7, is equal to that of the virtual recognition region 820 when the pointer display apparatus 400 is located further from the pointing device 300, which is illustrate in FIG. 8.

Accordingly, a user can determine the position of a pointer within the display region 210 to be in the same radius of action as the pointing device 300 regardless of the distance between the pointer display apparatus 400 and the pointing device 300.

Figure 9A:
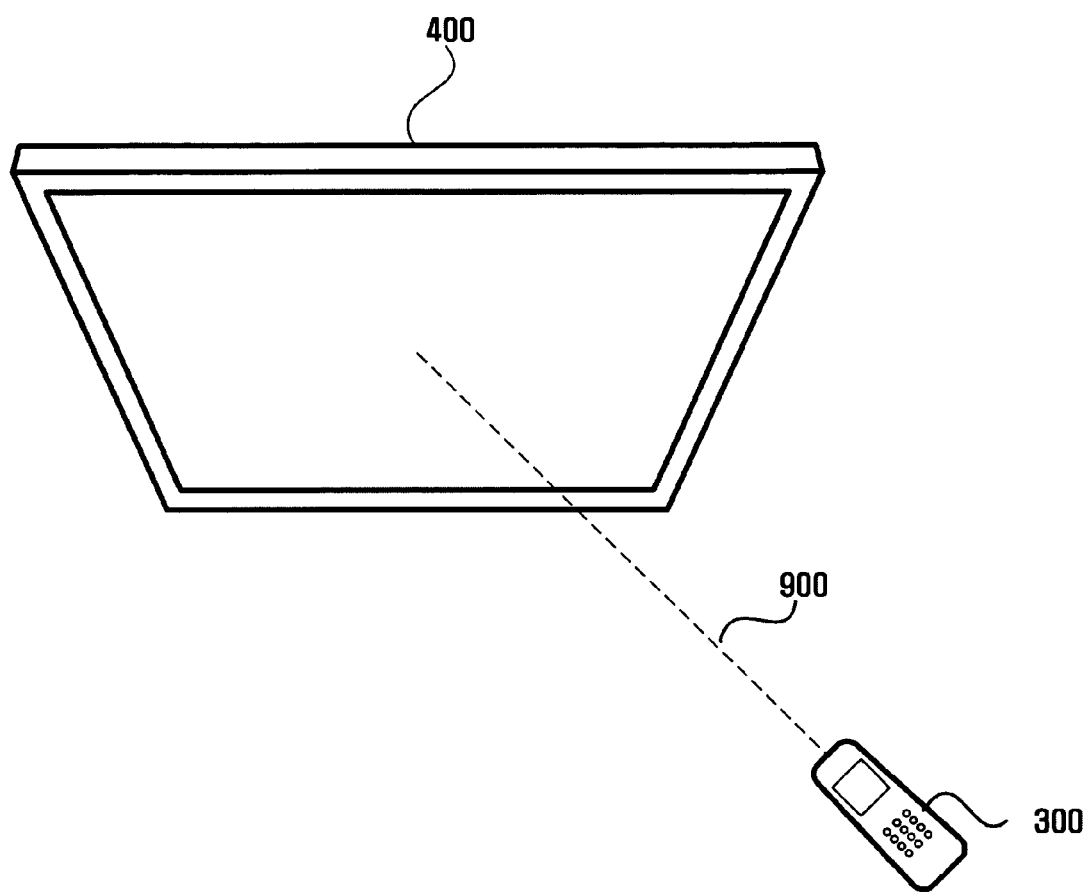
FIGS. 9A and 9B illustrate a virtual region generated according to a pointing direction of the pointing device according to an embodiment of the present invention.
Figure 9B:
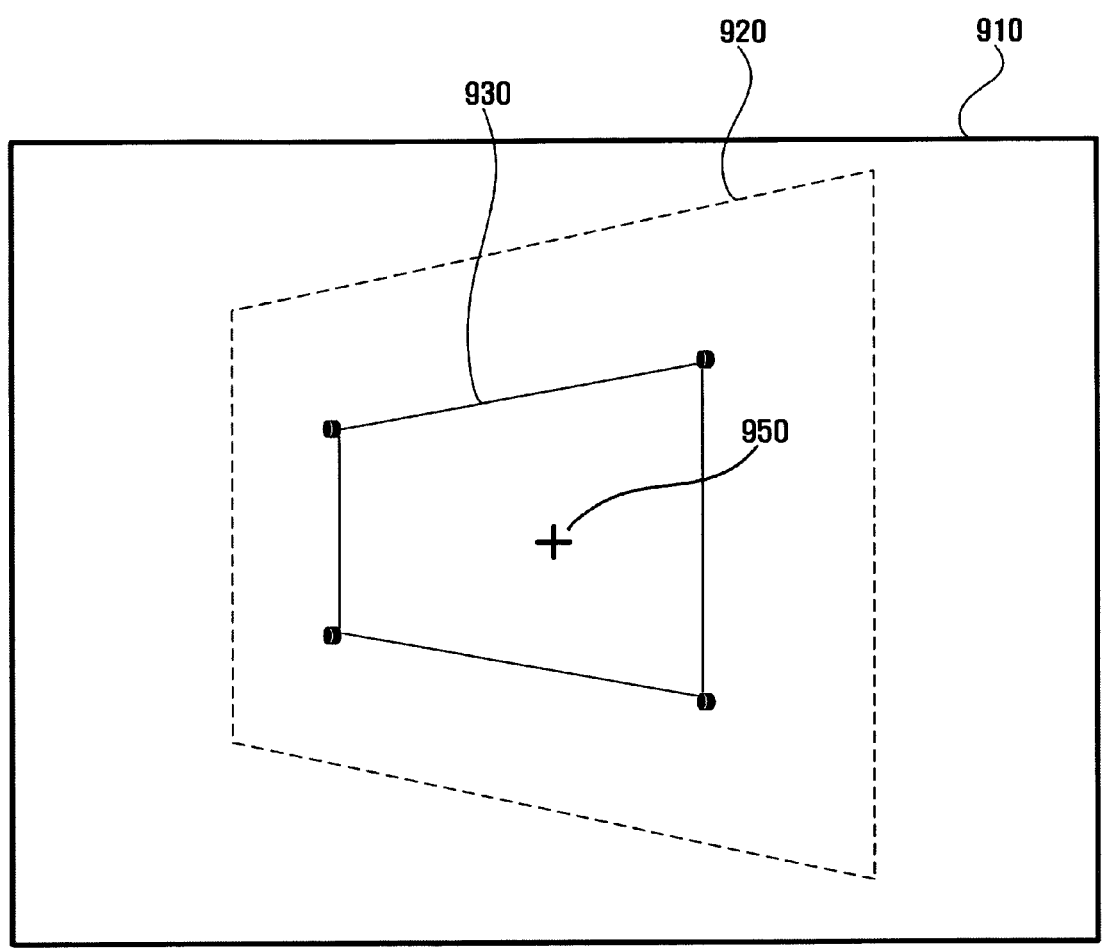

FIGS. 9A and 9B illustrate a virtual region generated according to a pointing direction 900 of the pointing device 300 according to an embodiment of the present invention. Specifically, FIGS. 9A and 9B illustrate a case where the pointing direction 900 is not perpendicular to the plane of the display region 210.

The region detector 310 of the pointing device 300 detects the shape of the display region 210 using a plurality of signals received from the region signal transmitter 410 of the pointer display apparatus 400. In other words, the region detector 310 detects the shape of the display region 210 with reference to the distance from the signal transmission units included in the region signal transmitter 410.

FIG. 9B illustrates a case where a display recognition region 930 and a virtual recognition region 920 generated according to the pointing direction 900 illustrated in FIG. 9A are included in a basic recognition region 910. Accordingly, coordinates of a pointer on the pointer display apparatus 400 are determined according to a location 950, which is pointed at by the pointing device 300, in the virtual recognition region 920.

Figure 10:
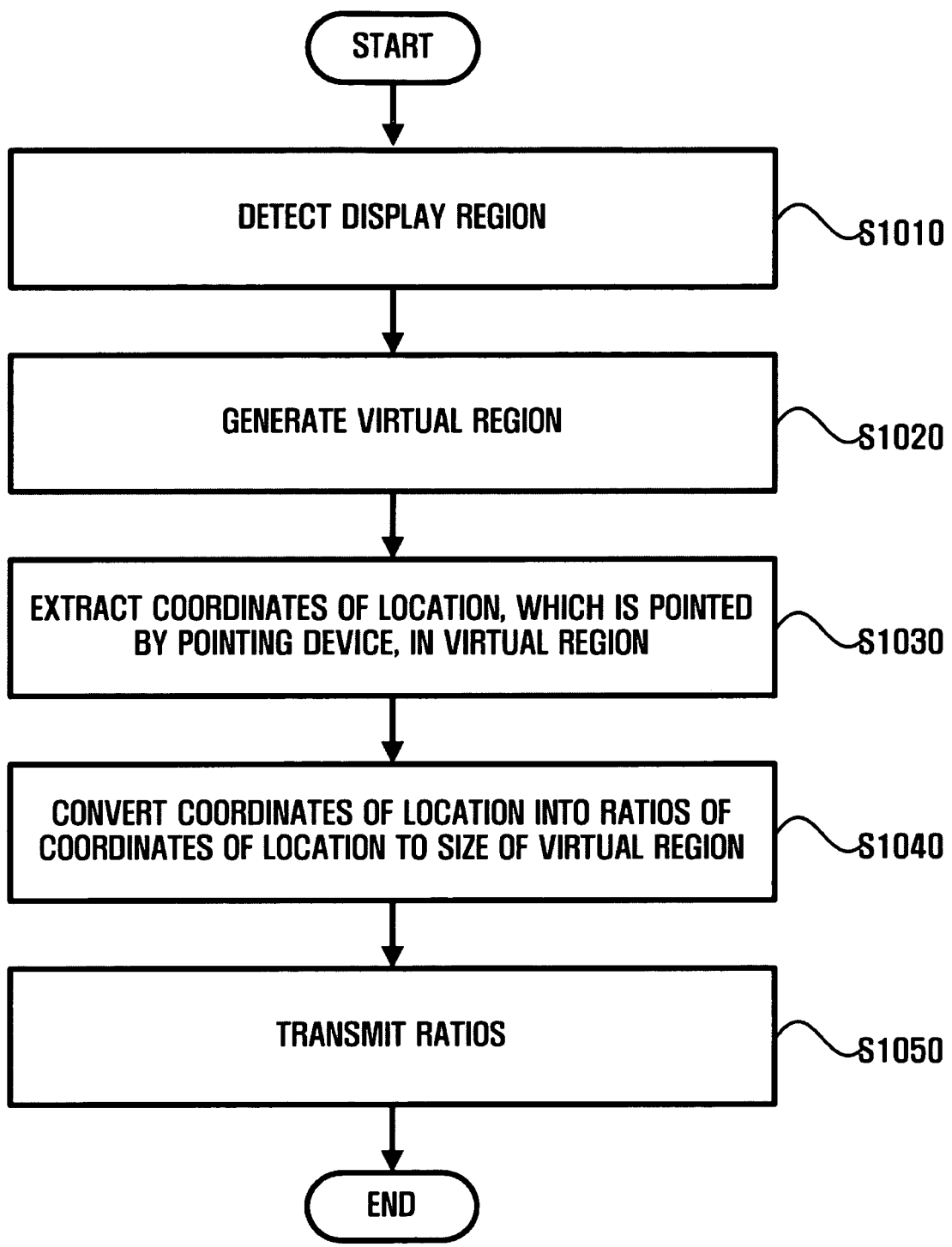
FIG. 10 is a flowchart illustrating the operation of the pointing device of FIG. 3.

FIG. 10 is a flowchart illustrating the operation of the pointing device 300 according to an embodiment of the present invention.

Referring to FIG. 10, the region detector 310 of the pointing device 300 detects the display region 210, which displays a pointer, using at least one received signal (operation S1010). The signals may include at least one of an infrared signal and an ultrasonic signal and may be different from one another. Accordingly, even when the region detector 310 detects only one signal, it can detect the entire shape of the display region 210.

The detected display region 210 is transmitted to the virtual region generator 320, which, in turn, generates a virtual region with an aspect ratio equal to that of the display region 210 (operation S1020). Here, the virtual region generator 320 generates the virtual region such that the center of the virtual region coincides with that of the display region 210. The size of the virtual region is determined by the distance between the display region 210 and the pointing device 300, and the shape of the virtual region is determined by a direction in which the pointing device 300 points.

The coordinate extractor 330 extracts coordinates of a location pointed at by the pointing device 300 based on the generated virtual region (operation S1030). In other words, the coordinate extractor 330 extracts the coordinates of the location, which is pointed at by the pointing device 300, in the generated virtual region. The coordinates extracted by the coordinate extractor 330 are absolute coordinates in the virtual region. In other words, since the size of a virtual recognition region, which is the virtual region recognized by the pointing device 300, is not affected by the distance between the pointer display apparatus 400 and the pointing device 300, the coordinate extractor 330 can extract absolute coordinates in the virtual recognition region.

The extracted coordinates of the location are transmitted to the coordinate converter 340, which, in turn, converts the received coordinates of the location into ratios of the coordinates of the location to the size of the virtual region (operation S1040). A detailed description of the method of converting coordinates of a location has been made above with reference to FIGS. 6A and 6B and thus will be omitted here.

The ratios of the coordinates of the location to the size of the virtual region are transmitted to the coordinate ratio transmitter 350, and the coordinate ratio transmitter 350 transmits the ratios to the pointer display apparatus 400 (operation S1050). Then, the pointer display apparatus 400 determines coordinates of a pointer based on the received ratios and displays the pointer accordingly.

FIG. 11 is a flowchart illustrating the operation of the pointer display apparatus 400 according to an embodiment of the present invention.

The region signal transmitter 410 of the pointer display apparatus 400 transmits signals using at least one signal transmission unit (operation S1110). The signals may include at least one of an infrared signal and an ultrasonic signal, and each signal may be unique to each signal transmission unit.

The coordinate ratio receiver 440 receives from the pointing device 300 ratios of coordinates of a location, which is pointed at by the pointing device 300, in a generated virtual region to the size of the virtual region in response to the signals transmitted from the region signal transmitter 410 (operation S1130). The received ratios are transmitted to the coordinate determiner 420, and the coordinate determiner 420 determines coordinates of a pointer in the display region 210 with reference to the received ratios. A detailed description of the method of determining coordinates of a pointer has been made above with reference to FIGS. 6A and 6B and thus will be omitted here.

The display unit 450 displays the pointer at the coordinates determined by the coordinate determiner 420 (operation S1140).

As described above, a pointer display apparatus and method using a virtual region according to the present invention provide at least one of the following advantages.

First, coordinates of a location pointed at by a pointing device in a virtual region are converted into coordinates of the location in a display region, and a pointer is displayed at the converted coordinates. Therefore, a user can easily position the pointer in the display region regardless of the distance between the pointer display apparatus and the pointing device.

Second, the user's hand shaking can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A pointing device comprising:
a region detector that detects a display region of a display apparatus;
a virtual region generator that generates a virtual region corresponding to the display region and changes a size of the virtual region according to a distance between the display apparatus and the pointing device;
a coordinate extractor that extracts coordinates of a location pointed by the pointing device in the virtual region; and
a transmitter that transmits, to the display apparatus, information related to the size of the virtual region and the coordinates of the pointed location in the virtual region,
wherein the virtual region is a region in which pointing can be performed by using the pointing device and which has an aspect ratio equal to that of the display region.

2. The pointing device of claim 1, wherein a center of the display region is equal to a center of the generated virtual region.

3. The pointing device of claim 1, wherein when the pointing device points to a left end of the virtual region, a pointer is displayed at a left end of the display region, and when the pointing device points to a right end of the virtual region, the pointer is displayed at a right end of the display region.

4. The pointing device of claim 1, wherein the size of the virtual region is larger than that of the display region if the distance is greater than a threshold value and smaller than that of the display region if the distance is smaller than a threshold value.

5. The pointing device of claim 1, further comprising a coordinate converter that converts the coordinates of the location pointed in the virtual region into ratios of the coordinates in the virtual region to the size of the virtual region.

6. The pointing device of claim 5, wherein the information transmitted by the transmitter includes the ratios of the coordinates in the virtual region to the size of the virtual region.

7. The pointing device of claim 6, wherein the display apparatus determines coordinates of a pointer displayed in the display region based on the ratios of the coordinates.

8. The pointing device of claim 7, wherein the display apparatus determines the coordinates of the pointer displayed in the display region by applying horizontal and vertical ratios included in the ratios of the coordinates in the virtual region to the size of the virtual region to horizontal and vertical sizes of the display region respectively.

9. The pointing device of claim 1, wherein the pointing device has an operating angle irrelevant to the distance between the display apparatus and the pointing device, and the operating angle has an operating angle range within which the pointing device points to a left or right end of the virtual region, resulting in a pointer on the display region pointing to a left or right end of the display region.

10. A method for determining coordinates of a pointer on a display apparatus using a pointing device comprising:
detecting a display region of the display apparatus;
generating a virtual region corresponding to the display region;
changing a size of the virtual region according to a distance between the display apparatus and the pointing device;
extracting coordinates of a location pointed by the pointing device in the virtual region; and
converting the extracted coordinates into coordinates in the display region according to the size of the virtual region.

11. The method of claim 10, wherein a center of the display region is equal to a center of the generated virtual region.

12. The method of claim 10, wherein when the pointing device points to a left end of the virtual region, a pointer is displayed at a left end of the display region, and when the pointing device points to a right end of the virtual region, the pointer is displayed at a right end of the display region.

13. The method of claim 10, wherein said changing a size of the virtual region comprises determining coordinates such that the size of the virtual region is larger than that of the display region if the distance is greater than a threshold value and smaller than that of the display region if the distance is smaller than a threshold value.

14. The method of claim 10, wherein said converting the extracted coordinates comprises converting the extracted coordinates into ratios of the coordinates in the virtual region to the size of the virtual region.

15. The method of claim 14, further comprising:
transmitting the ratios of the coordinates in the virtual region to the size of the virtual region to the display apparatus; and
determining, by the display apparatus, coordinates of a pointer displayed in the display region based on the ratios of the coordinates.

16. The method of claim 15, wherein said determining coordinates of a pointer comprises determining, in the display apparatus, the coordinates of the pointer displayed in the display region by applying horizontal and vertical ratios included in the ratios of the coordinates in the virtual region to the size of the virtual region to horizontal and vertical sizes of the display region respectively.

17. The method of claim 10, wherein the pointing device has an operating angle irrelevant to the distance between the display apparatus and the pointing device, and the operating angle has an operating angle range within which the pointing device points to a left or right end of the virtual region, resulting in a pointer on the display region pointing to a left or right end of the display region.

18. The method of claim 10, wherein the generated virtual region is a region in which pointing can be performed by using the pointing device and which has an aspect ratio equal to that of the display region.

* * * * *